United States Patent Office 3,413,304
Patented Nov. 26, 1968

3,413,304
13-ALKYL-17β-HYDROXY-A-NOR-5α-
GONANYL-[2,3-c]-PYRAZOLES
David B. R. Johnston, Fords, and Thomas B. Windholz,
Westfield, N.J., assignors to Merck & Co., Inc., Rahway,
N.J., a corporation of New Jersey
No Drawing. Filed Feb. 28, 1966, Ser. No. 530,336
3 Claims. (Cl. 260—310)

ABSTRACT OF THE DISCLOSURE

The invention disclosed herein relates to 3-hydroxy-methylene-10-hydrogen or methyl-13-lower alkyl-17β-hydroxy-A-nor-5α-gonan-2-one steroids, novel derivatives and novel methods for the preparation thereof. More particularly, this invention relates to 13-alkyl-17β-hydroxy-A-nor-5α-gonanyl-[2,3-c]-pyrazoles and the process for preparing them starting with the corresponding 13-alkyl-17β-hydroxy-A-nor-5α-gonan-2-one. In this process, as applied to the preparation of the 13-methyl embodiment of the invention, 17β-hydroxy-A-nor-5α-androstan-2-one (which may also be referred to as 13-methyl-17β-hydroxy-A-nor-5α-gonan-2-one) is reacted with dihydropyran in the presence of p-toluenesulfonyl chloride to form 17β-tetrahydropyranyloxy-A-nor-5α-androstan-2-one; the latter is then reacted with a lower alkyl formate in the presence of an alkaline reagent thereby forming the corresponding 3-hydroxymethylene derivative which, in turn, is reacted with a hydrazine compound and the reaction mixture is acidified thus forming the pyrazole ring and hydrolyzing the tetrahydropyranyloxy group to produce the corresponding 17β-tetrahydropyranyloxy-A-nor-5α-androstanyl [2,3-c]pyrazole compound. The compounds of the invention are inhibitors of progesterone.

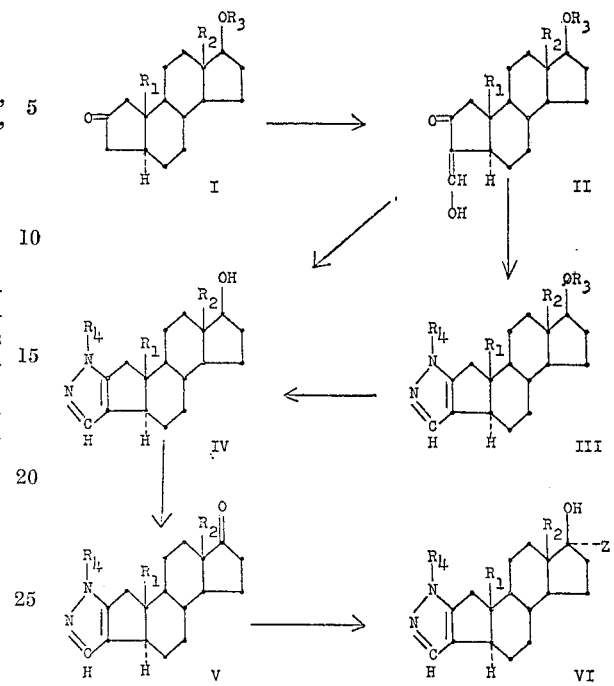

In its generic embodiments, the invention also relates to 3-hydroxymethylene-10-hydrogen or methyl-13-lower alkyl-17β-hydroxy, acyloxy or tetrahydropyranyloxy-A-nor-5α-gonan-2-one; [2,3-c]-pyrazole, phenyl pyrazole, or para-fluorophenylpyrazole-10-hydrogen or methyl-13-lower alkyl-17β-hydroxy, acyloxy, or tetrahydropyranyloxy-A-nor-5α-gonane; [2,3-c]-pyrazole, phenyl pyrazole, or para-fluorophenyl pyrazole-10-hydrogen or methyl-13-lower alkyl-A-nor-5α-gonan-17-one, and [2,3-c]-pyrazole, phenyl pyrazole, or para-fluorophenyl pyrazole-10-hydrogen or methyl-13-lower alkyl-17α-lower, haloalkyl, alkenyl, haloalkenyl, alkynyl, or haloalkynyl-A-nor-5α-gonon-17β-ol steroids and methods for the preparation thereof.

The starting compound for the preparation of the novel compounds of this invention is a 10-hydrogen or methyl-13-lower alkyl-17β-hydroxy, acyloxy or tetrahydropyranyl-oxy-A-nor-5α-gonan-2-one (Compound I). The novel process for the preparation of the novel compounds of this invention may be schematically represented as follows; wherein $R_1$ is hydrogen or a methyl group, $R_2$ is a lower alkyl group, preferably having not more than five carbon atoms, $R_3$ is hydrogen, a lower acyl or tetrahydropyranyl group, $R_4$ is hydrogen, a phenyl of para-fluorophenyl group, and Z is a lower alkyl or haloalkyl group, preferably having not more than five carbons atoms, an alkenyl or haloalkenyl group, preferably having not more than three carbon atoms, or an alkynyl or haloalkynyl group, preferably having not more than three carbon atoms.

The first step in the novel synthesis of this invention is the reaction of Compound I with a lower alkyl formate, preferably ethyl formate, in the presence of an alkaline reagent, such as an alkali metal hydride, such as sodium, lithium or potassium hydride or an alkali metal amide, such as sodium amide. The reaction is conducted in solution in an aromatic hydrocarbon, such as benzene or toluene, and it is preferred that a small amount of a lower aliphatic alcohol, preferably tertiary-butanol, also be present in the reaction mixture. Compound I may have a free 17β-hydroxy group or the hydroxy group may be protected by the formation of a 17β-acyloxy group or a 17β-tetrahydropyranyloxy group. In carrying out the first-step reaction, the alkali reagent, which may be in the form of mineral oil suspension, is added to a solution of Compound I in the aromatic hydrocarbon and a small amount of the aliphatic alcohol may then be added to the solution. The reaction mixture is stirred for a short time at room temperature and then the lower alkyl formate is added slowly. After addition of alkali formate is complete, the reaction mixture is stirred at room temperature for several hours. The reagents and solvents used are anhydrous and the reaction mixture is protected from moisture until the reaction is complete. The reaction product may be isolated by shaking the reaction mixture with Claisen's alkali, prepared by combining 7 g. potassium hydroxide, 5 ml. water and 20 ml. methanol, and in the presence of an organic solvent, such as benzene or petroleum ether. The reaction product is soluble in the dilute aqueous alkali and the aqueous phase is separated from the organic phase and extracted with ether to remove any unreacted Compound I. The aqueous alkaline phase is carefully neutralized with a mildly acidic dilute aqueous reagent, preferably a dilute aqueous solution of sodium dihydrogen phosphate. If Compound I has a 17β-acyloxy or 17β-tetrahydropyranyloxy group, a mildly acidic reagent such as sodium dihydrogen phosphate, has the advantage that it does not cleave the acyloxy or tetrahydropyranyloxy linkage. The neutralized solution is extracted with a suitable solvent, such as ethyl acetate, the extracts are dried over anhydrous magnesium sulfate, and filtered, and the solvent is removed by distillation under reduced pressure. The residue of crude 3-hydroxymethylene-17β-hydroxy, acyloxy, or tetrahydropyranyloxy-A-nor-5α-androstan-2-one (Compound II) may be purified by crystallization from a suitable solvent, such as methanol.

The second step of the synthesis is the formation of the pyrazole ring. This is accomplished by heating a solution of Compound II in a lower aliphatic alcohol, preferably ethanol, containing hydrazine hydrate, or a hydrate of a substituted hydrazine, such as phenyl hydrazine or para-fluorophenyl hydrazine. It is preferred that in preparing the reaction mixture, the hydrazine hydrate or substituted hydrazine hydrate be added in the form of a concentrated aqueous solution. After the heating period, the mixture is cooled to room temperature and an amount of concentrated mineral acid, preferably hydrochloric acid, is added sufficient to make the reaction mixture acid. The acidified solution is allowed to stand for several hours at room temperature and then poured into aqueous mineral acid solution, preferably about 2.5 N hydrochloric acid solution, and this solution is stirred for a short time at room temperature. The reaction product may be isolated by carefully neutralizing the reaction mixture with dilute aqueous alkali solution and extracting the neutralized solution with a suitable solvent, such as ethyl acetate. The extract is dried over anhydrous magnesium sulfate, filtered, and the solvent is removed by distillation under reduced pressure. The residue is [2,3-c]-pyrazole-17β-hydroxy-A-nor-5α-androstane (Compound III), and may be purified by crystallization from a suitable solvent, such as an ethyl acetate-methanol solution. If Compound II has a 17β-acyloxy or 17β-tetrahydropyranyloxy group, and it is desired that Compound III have the corresponding 17β-acyloxy or 17β-tetrahydropyranyloxy group, the reaction mixture is diluted with water and extracted with a suitable solvent, such as ethyl acetate, and the reaction product is then isolated in the same manner as above. Compound III, which has a 17β-acyloxy or 17β-tetrahydropyranyloxy group, may be treated after isolation and purification with a mineral acid, such as a 2.5 N hydrochloric acid solution to provide Compound III which has a 17β-hydroxy group.

The third step in the synthesis is the oxidation of the 17β-hydroxy group of Compound III to a keto group. Oxidation is preferably accomplished by the use of chromium trioxide in pyridine solution. Oxidation may also be accomplished by the addition of a solution of chromium trioxide in dilute sulfuric acid to an acetone solution of Compound III or by the use of aluminum isopropoxide in the presence of cyclohexanone in an aromatic hydrocarbon solvent, such as benzene or toluene.

Oxidation with chromium trioxide in pyridine solution is accomplished by adding a solution of Compound IV in pyridine to a cooled suspension of chromium trioxide in pyridine and allowing the reaction mixture to stand for several hours at room temperature. The oxidation product may be recovered by diluting the reaction mixture with a suitable organic solvent, preferably ethyl acetate, filtering to remove insoluble salts, washing the filtrate with water, drying the washed filtrate, and removing the solvent from the dried solution by distillation under reduced pressure. The residue of [2,3-c]-pyrazole-A-nor-5α-androstan-17-one (Compound V) may be purified by crystallization from a suitable solvent, such as methanol.

Oxidation by the use of chromium trioxide and dilute sulfuric acid in an acetone solution may be accomplished by adding a solution of chromium trioxide in dilute sulfuric acid to a cold acetone solution of Compound IV and keeping the temperature of the reaction mixture during the addition substantially below room temperature. The reaction mixture is stirred during the addition and for a short time after addition is complete. The oxidation product may be isolated by diluting the reaction mixture with water, extracting with ether, washing the extract with dilute aqueous sodium bicarbonate solution, drying the extract over anhydrous magnesium sulfate, filtering, and removing the solvent by distillation under reduced pressure. The residue is Compound V.

Oxidation of Compound IV with aluminum isopropoxide in the presence of cyclohexanone is accomplished by heating a solution of Compound IV and aluminum isopropoxide in an aromatic hydrocarbon solvent, such as dry benzene or toluene, on a steam bath under an atmosphere of nitrogen and then cooling the reaction mixture to approximately room temperature. Cyclohexanone is then added and the reaction mixture is again heated. The oxidation product is isolated by cooling the reaction mixture in an ice bath, adding a saturated aqueous solution of Rochelle salts with vigorous shaking and extracting the resulting mixture with ether. The ether is removed by distillation under reduced pressure and the residue is steam distilled. The residue from the steam distillation is extracted with ether, the extract is dried over anhydrous magnesium sulfate, filtered and the ether is removed by distillation under reduced pressure. The residue is Compound V.

The fifth step in the synthesis is the introduction of a 17α-alkyl, haloalkyl, alkenyl, haloalkenyl, alkynyl, or haloalkynyl group into Compound V. Reagents which are suitable for the introduction of a 17α-ethynyl or 17α-haloethynyl group into Compound V are metal acetylides, such as sodium or potassium acetylide, lithium acetylide, lithium chloroacetylide, lithium methylacetylide, ethynyl and ethynylmethyl magnesium chloride or bromide and trifluoromethylethynyl magnesium chloride or bromide.

Introduction of a 17α-ethynyl group is preferably accomplished by bubbling acetylene into a solution of Compound V in a suitable solvent, such as dry tetrahydrofuran and gradually adding a solution of an alkali metal, preferably potassium metal, in a aliphatic alcohol, preferably tertiaryamyl alcohol or tertiary-butyl alcohol, and continuing to bubble acetylene into the reaction mixture after addition of the alkali metal solution is complete. The reaction product may be isolated by pouring the reaction mixture into a saturated aqueous solution of a mildly acidic reagent, such as sodium dihydrogen phosphate, and extracting the acidified solution with a suitable solvent, such as ethyl acetate. The extract is dried over anhydrous magnesium sulfate, filtered, and the solvent is removed by distillation under reduced pressure. The residue is [2,3-cl-pyrazole - 17α-ethynyl-A-nor-5a - androstan - 17β-ol (Compound VI). Compound VI may be purified by chromatography on silica gel and crystallization from a suitable solvent, such as methanol.

Introduction of a 17a-haloethynyl group into Compound V is preferably accomplished by forming the haloethyne in situ by the reaction of a 1,2-dihaloethylene (prefarably the cis form) and methyl lithium. For example, a solution of cis-1,2-dichloroethylene in anhydrous ether is added to a stirred solution of methyl lithium in anhydrous ether under an atmosphere of nitrogen. The reaction mixture is maintained at a temperature of about 0° C. until addition is complete. The ice bath is then removed and a solution of Compound V in anhydrous ether is slowly added. The reaction product may be isolated by pouring the reaction mixture into ice water and ether, separating the ether solution, drying the ether solution over anhydrous potassium carbonate, filtering, and removing the ether by distillation under reduced pressure. The residue is Compound VI having a 17α-chloroethynyl group.

17α-alkenyl and 17α-haloalkenyl groups may be introduced into Compound V directly by the use of alkenyl and haloalkenyl magnesium halides or by the hydrogenation of 17α-alkynyl and 17α-haloalkynyl groups by the use of a poisoned catalyst, such as a palladium or barium sulfate poisoned with lead tetracetate or quinoline.

A 17α-alkyl or 17α-haloalkyl group may be introduced into Compound V by the use of a Grignard reaction in which an alkyl or haloalkyl magnesium halide is reacted with Compound V or by using a lithium alkyl or lithium haloalkyl reagent.

17α-alkyl and 17α-haloalkyl groups may also be introduced into Compound V by the hydrogenation of 17α-alkene, 17α-haloalkene, 17α-alkyne and 17α-haloalkyne groups by the use of a suitable catalyst, such as a 5% palladium-on-charcoal catalyst.

The compounds of this invention have valuable pharmacological properties. They are potent inhibitors of progesterone as demonstrated by their inhibition of the effect of progesterone on the endometrium of the rabbit.

The following examples illustrate methods of carrying out the present invention, but it is to be understood that these examples are given for purposes of illustration and not of limitation.

Example 1.—3 - hydroxymethylene - 17β-tetrahydropyranyloxy-A-nor-5α-androstan-2-one 1.09 grams of para-toluenesulfonyl chloride is added to a suspension of 5.275 g. of 17β - hydroxy-A-nor - 5α-androstan-2-one in 50 ml. of dry distilled dihydropyran. The mixture gradually becomes homogenous and is allowed to stand at room temperature overnight. The solution is then poured into a cold aqueous sodium bicarbonate solution and extracted three times with 25 ml. portions of ether. The ether extracts are combined, dried over anhydrous magnesium sulfate, filtered, and the solvent is removed by distillation under reduced pressure. The residue is 17β-tetrahydropyranyloxy-A-nor-5α-androstan-2-one and is recrystallized from methanol. 5 grams of recrystallized product are obtained.

20.6 grams of a 53% in mineral oil suspension of sodium hydride added to a solution of 12.3 g. of 17β-tetrahydropyranyloxy-A-nor-5α-androstan - 2-one which had been azeotropically dried with 100 ml. of benzene, in 300 ml. of dry benzene. 10 milliliters of dry tertiary-butanol are then added to the benzene solution. The reaction mixture is stirred for 15 minutes at room temperature and then 40 ml. of dry freshly distilled ethyl formate are added over a period of 30 minutes. The reaction mixture is stirred at room temperature overnight and then added to and shaken with a 2-phase system comprising equal volumes of Claisen's alkali solution and benzene. The aqueous and organic phases are separated and the aqueous phase is extracted with three 50 ml. portions of ether. The aqueous alkaline phase is carefully neutralized with dilute aqueous sodium dihydrogenphosphate solution and the neutralized solution is extracted three times with 50 ml. portions of ethyl acetate. The combined ethyl acetate extracts are dried over anhydrous magnesium sulfate, filtered, and the solvent is removed by distillation under reduced pressure. 8.8 grams of crude 3-hydroxymethylene-17β-tetrahydropyranyloxy-A-nor - 5α-androstan-2-one are obtained as residue and is purified by crystallization from methanol.

In the same manner, 3-hydroxymethylene-17β-hydroxy-A-nor-5α-androstan-2-one is prepared from 17β-hydroxy-A-nor-5α-androstan-2-one and 3-hydroxymethylene-17β-acetoxy-A-nor-5α-androstan-2-one is prepared from 17β-acetoxy-A-nor-5α-androstan-2-one.

Example 2.—[2,3-c]-pyrazole-17β-hydroxy-A-nor-5α-androstane

A solution of 8.8 g. of 3-hydroxymethylene-17β-tetrahydropyranyloxy-A-nor-5α-androstan-2-one in 50 ml. of ethanol containing 1 ml. of 85% aqueous hydrazine hydrate solution is refluxed for three hours and then cooled to room temperature. The reaction mixture is then diluted with water and the diluted solution is extracted three times with 25 ml. portions of ethyl acetate. The ethyl acetate extracts are combined, dried over anhydrous magnesium sulfate, filtered, and the solvent is removed by distillation under reduced pressure. The residue is [2,3-c]-pyrazole-17β-hydroxy-A-nor-5α-androstane and is purified by crystallization from an ethyl acetate-methanol solution. 5.0 grams of recrystallized product having a melting point of 260° C. are obtained.

In the same manner, [2,3-c]-pyrazole-17β-hydroxy-A-nor-5α-androstane is prepared from 3-hydroxymethylene-17β-hydroxy-A-nor-5α-androstan-2-one.

Example 3.—[2,3-c]-phenyl pyrazole-17β-hydroxy-A-nor-5α-androstane

A solution of 8.8 g. of 3-hydroxymethylene-17β-tetrahydropyranyloxy-A-nor-5α-androstan-2-one in 50 ml. of ethanol containing 3 ml. of 85% aqueous phenyl hydrazine hydrate solution is refluxed for three hours and then cooled to room temperature. 10 milliliters of concentrated hydrochloric acid is added gradually with stirring to the cooled solution and the acidified solution is allowed to stand overnight at room temperature. The reaction mixture is then poured into 150 ml. of 2.5 N hydrochloric acid solution and the resulting solution is stirred for one hour at room temperature. The reaction mixture is then carefully neutralized with dilute aqueous sodium hydroxide solution and the neutralized solution is extracted three times with 25 ml. portions of ethyl acetate. The ethyl acetate extracts are combined, dried over anhydrous magnesium sulfate, filtered, and the solvent is removed by distillation under reduced pressure. The residue is [2,3-c]-phenyl pyrazole-17β-hydroxy-A-nor-5α-androstane and is purified by crystallization from an ethyl acetate-methanol solution.

In the same manner, [2,3-c]-phenyl pyrazole-17β-hydroxy-A-nor-5α-androstane is prepared from 3-hydroxymethylene-17β-hydroxy-A-nor-5α-androstan-2-one.

Example 4.—[2,3-c]-para-fluorophenyl pyrazole-17β-hydroxy-A-nor-5α-androstane

A solution of 8.8 g. of 3-hydroxymethylene-17β-tetrahydropyranyloxy-A-nor-5α-androstan-2-one in 50 ml. of ethanol containing 4 ml. of 85% aqueous para-fluorophenyl hydrazine hydrate solution is refluxed for three hours and then cooled to room temperature. 10 milliliters of concentrated hydrochloric acid is added gradually with stirring to the cooled solution and the acidified solution is allowed to stand overnight at room temperature. The reaction mixture is then poured into 150 ml. of 2.5 N hydrochloric acid solution and the resulting solution is stirred for one hour at room temperature. The reaction mixture is then carefully neutralized with dilute aqueous sodium hydroxide solution and the neutralized solution is extracted three times with 25 ml. portions of ethyl acetate. The ethyl acetate extracts are combined, dried over anhydrous magnesium sulfate, filtered, and the solvent is removed by distillation under reduced pressure. The residue is [2,3-c]-para-fluorophenyl pyrazole-17β-hydroxy-A-nor-5α-androstane and is purified by crystallization from an ethyl acetate-methanol solution.

In the same manner, [2,3-c]para-fluorophenyl pyrazole-17β-hydroxy-A-nor-5α-androstane is prepared from 3-hydroxymethylene-17β-hydroxy-A-nor - 5α - androstan-2-one.

Example 5.—[2,3-c]-pyrazole-A-nor-5α-androstan-17-one

A solution of 2.3 g. of [2,3-c]-pyrazole-17β-hydroxy-A-nor-5α-androstane in 20 ml. of pyridine is added to a cooled suspension of 2.4 g. of chromium trioxide in 25 ml. of pyridine. The reaction mixture is allowed to stand overnight at room temperature and then diluted with 50 ml. of ethyl acetate. The insoluble salts are removed from the reaction mixture by filtration and the filtrate is washed with three 25 ml. portions of water, dried over anhydrous magnesium sulfate, filtered, and the solvent is removed by distillation under reduced pressure. The residue is [2,3-c]-pyrazole-A-nor-5α-androstan- 17-one and is purified by crystallization from methanol. 1.6 grams of recrystallized material having a melting point of 280°–285° C. are obtained.

*Analysis.*—($C_{19}H_{26}ON_2$) calculated: C, 76.76%; H, 8.69%; N, 8.91%. Found: C, 76.47%; H, 8.78%; N, 9.39%.

In the same manner, [2,3-c]-phenyl pyrazole-A-nor-5α-androstan-17-one is prepared from [2,3-c]-phenyl pyrazole-17β-hydroxy-A-nor-5α-androstan and [2,3-c]-para-fluorophenyl pyrazole-A-nor-5α-androstan-17-one is prepared from [2,3-c]-para-fluorophenyl pyrazole-17β-hydroxy-A-nor-5α-androstane.

Example 6.—[2,3-c]-pyrazole-A-nor-5α-androstan-17-one

A sclution of 2.4 g. of chromium trioxide in 7 ml. of water containing 2.1 ml. of concentrated sulfuric acid is added gradually over a period of 2 hours to a stirred solution of 2.3 g. of [2-3-c]-pyrazole-17β-hydroxy-A-nor-5α-androstane in 10 cc.'s of acetone. The temperature during the addition is maintained from about 5–10° C. The reaction mixture is stirred for 30 minutes after addition is complete and is then diluted with water to 60 ml. The diluted reaction mixture is extracted three times with 10 ml. portions of ether. The ether extracts are combined, washed with dilute aqueous sodium bicarbonate solution, dried over anhydrous magnesium sulfate, filtered, and the ether is removed by distillation under reduced pressure. The residue is [2,3-c]-pyrazole-A-nor-5α-androstan-17-one.

Example 7.—[2,3-c]pyrazole-A-nor-5α-androstan-17-one

A solution of 2.3 g. of [2,3-c]-pyrazole-17β-hydroxy-A-nor-5α-androstane, 3.0 g. of freshly distilled aluminum isopropoxide and 125 ml. of dry toluene is heated on a steam bath for 5 minutes under an atmosphere of nitrogen. The solution is cooled in ice and 25 ml. of distilled cyclohexanone are added. The solution is again heated on a steam bath under nitrogen for 40 minutes and then cooled in ice. A saturated aqueous solution of Rochelle salts is added with vigorous shaking and this solution is extracted three times with 20 ml. portions of ether. The ether extracts are combined and the ether is removed by distillation under reduced pressure. The residue is steam distilled and then extracted with ether. The ether extract is dried over anhydrous magnesium sulfate, filtered, and the ether is removed by distillation under reduced pressure. The residue is [2,3-c]-pyrazole-A-nor-5α-androstan-17-one.

Example 8.—[2,3-c]-pyrazole-17α-ethynyl-A-nor-5α-androstan-17β-ol

A steady stream of dry acetylene is bubbled into a solution of 400 mg. of [2,3-c]-pyrazole-A-nor-5α-androstan-17-one in 50 ml. of dry tetrahydrofuran and a solution of 2 g. of potassium metal in 75 ml. of tertiary-amyl alcohol is gradually added over a period of 40 minutes as the acetylene is bubbled through the solution. After addition of the potassium metal solution is complete, the acetylene is bubbled through the solution overnight. The reaction mixture is then poured into the 50 ml. of saturated aqueous solution of sodium dihydrogen phosphate and 50 ml. of water. The resulting solution is extracted three times with 25 ml. portions of ethyl acetate. The extracts are combined, dried over anhydrous magnesium sulfate, filtered, and the solvent is removed by distillation under reduced pressure. The residue is crude [2,3-c]-pyrazole-17α-ethynyl-A-nor-5α-androstan-17β-ol and is purified by chromatography on silica gel and crystallization from methanol. 235 Milligrams of the recrystallized material having a melting point of 230° C. are obtained.

In the same manner, [2,3-c]-phenyl pyrazole-17α-ethynyl-A-nor-5α-androstan-17β-ol is prepared from [2,3-c]-phenyl pyrazole-A-nor-5α-androstan-17-one and [2,3-c]-para-fluorophenyl pyrazole-17α-ethynyl-A-nor-5α-androstan-17β-ol is prepared from [2,3-c]-para-fluorophenyl pyrazole-A-nor-5α-androstan-17-one.

Example 9.—[2,3-c]-pyrazole-17α-chloroethynyl-A-nor-5α-androstan-17β-ol

A solution of 6.8 g. of cis-1,2-dichloroethylene in 40 ml. of sodium-dried ether is added over a period of one-half hour to 12 ml. of 1.4 N solution of methyl lithium (prepared by adding lithium to methyl iodide in a dry ether solution under nitrogen at about 10° C.) in 100 ml. of sodium dried ether. The temperature of the reaction mixture during the addition is maintained at about 0° C. After addition is complete, the reaction mixture is stirred at room temperature under nitrogen for an additional one and one-half hours. 400 milligrams of [2,3-c]-pyrazole-A-nor-5α-androstan-17-one in 15 ml. of sodium-dried ether is then added over a period of 15 minutes. The mixture is allowed to stand with stirring overnight and then poured into ice-water. The aqueous mixture is extracted three times with 25 ml. portions of ether. The ether extracts are combined, washed with water, dried over anhydrous sodium sulfate, filtered, and the ether is removed by distillation under reduced pressure. The residue is crude [2,3-c]-pyrazole-17α-chloroethynyl-A-nor-5α-androstan 17β-ol and is purified by chromatography on silica gel and crystallized from methanol.

In the same manner, [2,3-c]-phenyl pyrazole-17α-chloroethynyl-A-nor-5α-androstan-17β-ol is prepared from [2,3-c]-phenyl pyrazole-A-nor-5α-androstan-17-one and [2,3-c]-para-fluorophenyl pyrazole-17α-chloroethynyl-A-nor-5α-androstan-17β-ol is prepared from [2,3-c]-para-fluorophenyl pyrazole-A-nor-5α-androstan-17-one.

Example 10.—[2,3-c]-pyrazole-17α-ethyl-A-nor-5α-androstan-17β-ol 0.2 gram of 5% palladium-on-charcoal catalyst is added to a solution of 200 mg. of [2,3-c]-pyrazole-17α-ethynyl-A-nor-5α-androstan-17β-ol in 10 ml. of purified dioxane. The mixture is shaken in an atmosphere of hydrogen until two molecular equivalents of hydrogen are absorbed. The catalyst is removed by filtration and the filtrate is evaporated to dryness under reduced pressure. The residue is [2,3-c]-pyrazole-17α-ethyl-A-nor-5α-androstan-17β-ol and is purified by crystallization from methanol.

Example 11.—[2,3-c]-pyrazole-17α-allyl-A-nor-5α-androstan-17β-ol

A suspension of 2 g. of [2,3-c]-pyrazole-A-nor-5α-androstan-17-one in 9.5 g. of allyl bromide and 40 ml. of ether is added dropwise to a Grignard solution prepared by adding 0.5 g. of allyl bromide in 5 ml. of dry ethyl ether to 0.85 g. of magnesium turnings (activated with iodine) covered with 20 ml. of anhydrous ether. After spontaneous refluxing ceases, the reaction mixture is refluxed for an additional 2½ hours and then cooled in an ice bath. 50 milliliters of 10% aqueous ammonium chloride are added to the cooled reaction mixture. The ether layer is removed, washed with ice water, dried over anhydrous sodium sulfate, filtered, and the ether is removed by distillation under reduced pressure. The residue is [2,3 - c] - pyrazole-17α-allyl-A-nor-5α-androstan-17β-ol and is purified by crystallization from methanol.

Example 12.—[2,3-c]-pyrazole-17α-propyl-A-nor-5α-androstan-17β-ol 0.5 gram of a 5% palladium-on-charcoal catalyst is added to a solution of 1.15 g. of [2,3-c]-pyrazole-17α-allyl-A-nor-5α-androstan-17β-ol in 20 ml. of ethanol. The mixture is shaken in an atmosphere of hydrogen until one molecular equivalent of hydrogen is absorbed. The catalyst is removed by filtration and the solvent is removed by distillation under reduced pressure. The residue is

[2,3-c]-pyrazole-17α-propyl-A-nor - 5α - androstan-17β-ol and is purified by crystallization from methanol.

Various changes and modifications may be made in carrying out the present invention without departing from the spirit and scope thereof. Insofar as these changes and modifications are within the purview of the annexed claims, they are to be considered as part of our invention.

We claim:
1. A compound of the formula:

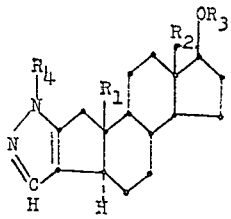

wherein $R_1$ is hydrogen or methyl, $R_2$ is lower alkyl, $R_3$ is hydrogen or acetyl or tetrahydropyranyl, and $R_4$ is hydrogen, phenyl or para-fluorophenyl.

2. A compound of the formula:

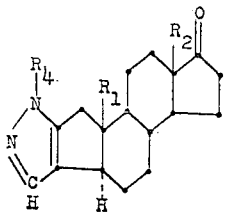

wherein $R_1$ is hydrogen or methyl, $R_2$ is lower alkyl, and $R_4$ is hydrogen, phenyl or parafluorophenyl.

3. A compound of the formula:

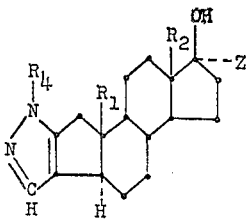

wherein $R_1$ is hydrogen or methyl, $R_2$ is lower alkyl, $R_4$ is hydrogen, phenyl or para-fluorophenyl, and Z is lower alkyl, halo-lower alkyl, lower alkenyl, halo-lower alkenyl, lower alkynyl, or halo-lower alkynyl.

References Cited

UNITED STATES PATENTS

| | | | |
|---|---|---|---|
| 3,030,358 | 4/1962 | Manson | 260—239.5 |
| 3,040,091 | 6/1962 | Weisenborn | 260—488 |
| 3,114,749 | 12/1963 | Ruggieri et al. | 260—239.5 |
| 3,144,447 | 8/1964 | Bowers et al. | 260—239.5 |
| 3,170,919 | 2/1965 | Fried | 260—488 |
| 3,210,406 | 10/1965 | Weisenborn | 260—488 |
| 3,296,300 | 1/1967 | Levine | 260—488 |
| 3,300,486 | 1/1967 | Anner et al. | 260—239.5 |

HENRY R. JILES, *Primary Examiner.*

NATALIE TROUOF, *Assistant Examiner.*